(12) United States Patent
George et al.

(10) Patent No.: US 7,420,744 B2
(45) Date of Patent: Sep. 2, 2008

(54) AMBIENT ENVIRONMENT INDEX OF REFRACTION INSENSITIVE OPTICAL SYSTEM

(75) Inventors: David M. George, Los Gatos, CA (US); W. Clay Schluchter, Los Altos, CA (US); Robert Todd Belt, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 15 days.

(21) Appl. No.: 11/623,946

(22) Filed: Jan. 17, 2007

(65) Prior Publication Data

US 2007/0115557 A1      May 24, 2007

Related U.S. Application Data

(63) Continuation-in-part of application No. 11/119,471, filed on Apr. 29, 2005, now abandoned.

(51) Int. Cl.
*G02B 1/06* (2006.01)
*G02B 3/12* (2006.01)

(52) U.S. Cl. .................................. 359/665; 359/667
(58) Field of Classification Search .......... 359/665–667
See application file for complete search history.

(56) References Cited

U.S. PATENT DOCUMENTS 5,074,629 A * 12/1991 Zdeblick ..................... 385/14

* cited by examiner

*Primary Examiner*—William C Choi
(74) *Attorney, Agent, or Firm*—June L. Bouscaren

(57) ABSTRACT

A refractive optical system may be a collimator, focusing optical system, reducer, or expander and includes an entrance optical element, an exit optical element, and a volume disposed between the entrance and exit optical elements. The volume is configured to have an index of refraction that is insensitive to changes in atmospheric conditions of the ambient environment. A surface of curvature of an input surface of the entrance optical element is parallel to a wavefront curvature of an input light beam and an output surface of the exit optical element is parallel to a wavefront curvature of an exit light beam. Accordingly, the wavefront curvature of the exit light beam is insensitive to the ambient environment permitting the production and operation environments to change without a change to the performance of the optical system.

17 Claims, 3 Drawing Sheets

AMBIENT ENVIRONMENT INDEX OF REFRACTION INSENSITIVE OPTICAL SYSTEM

CROSS REFERENCE TO RELATED APPLICATIONS

This application is a continuation in part of commonly owned patent application Ser. No. 11/119,471 filed Apr. 29, 2005 now abandoned.

BACKGROUND

Many optical systems use one or more refractive optical elements. These optical elements fall into a few canonical forms, e.g. lenses and prisms, and comprise two or more index of refraction discontinuities. Refractive optical elements can in turn be combined to form refractive optical systems such as collimators, focusing optical system, microscopes, telescopes, projection lenses, and interferometers. These elements are chosen to achieve system functions and to meet performance requirements. Precision refractive optical systems can be used in collimated laser applications, such as metrology, and imaging applications, such as photolithography. A refractive telescope, for example, typically comprises more than one lens element and is designed to achieve light collection and magnification in imaging applications, or beam expansion or reduction in collimated laser applications. Because of the precise optical operation, a high performance system, such as a collimator, focusing optical system, expander, or reducer, also requires calibration and testing during the production process to ensure that it will work for its intended purpose. Production and calibration is typically and most desirably performed in an ambient environment that is of standard atmospheric conditions. Operation of the system, however, may occur under different ambient conditions, such under vacuum or near-vacuum conditions (space for example) or in a fluid environment such as underwater. As one of ordinary skill in the art appreciates the ambient index of refraction changes with changes in pressure, temperature, gaseous composition, etc. Accordingly, an unfortunate situation arises where a collimator performs differently under the ambient conditions of production, test and calibration, which are at standard atmosphere, when compared to the ambient conditions of intended operation, which may not be at standard atmosphere.

An existing solution to the different ambient conditions between production and operation is to present a corrective optic during production, test and calibration that corrects for the differences expected between production and operation ambient conditions. The corrective optic is used during production and is then removed prior to intended operation. While this solution is far preferable to no corrective measures, it is indirect and introduces more uncertainties.

In addition, some systems are so sensitive that even operational ambient changes create unacceptable perturbations.

There remains a need, therefore, for a collimator that is insensitive to changes in ambient environment conditions.

BRIEF DESCRIPTION OF THE DRAWINGS

An understanding of the present teachings can be gained from the following detailed description, taken in conjunction with the accompanying drawings of which like reference numerals in different drawings refer to the same or similar elements.

DETAILED DESCRIPTION

In the following detailed description, for purposes of explanation and not limitation, example embodiments disclosing specific details are set forth in order to provide an understanding of embodiments according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments. Such methods and apparatus are clearly within the scope of the present teachings.

Figure 1:
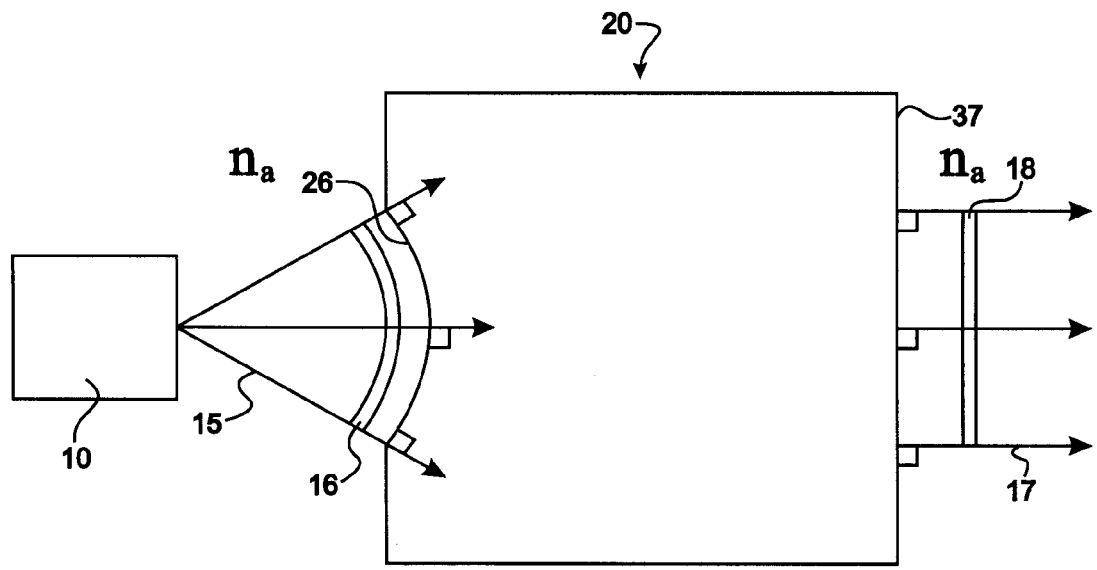
FIGS. 1 and 2 are conceptual views of embodiments of optical systems according to the present teachings.

With specific reference to FIG. 1 of the drawings, there is shown an embodiment of an optical system 20 according to the present teachings in which uncollimated input light 15 is accepted and collimated into output light 17 is produced from the input light 15. The index of refraction of the ambient environment is represented as $n_a$. The index of refraction, $n_a$, changes with changes in pressure, temperature, and gas composition of the ambient environment. The embodiment of FIG. 1 accepts the input light 15 and produces collimated output light 17 regardless of the value of $n_a$, and therefore, regardless of any changes in pressure, temperature and gas composition of the ambient environment. The embodiment of FIG. 1, therefore, exhibits ambient index of refraction insensitivity (herein "AIRI").

Figure 2:
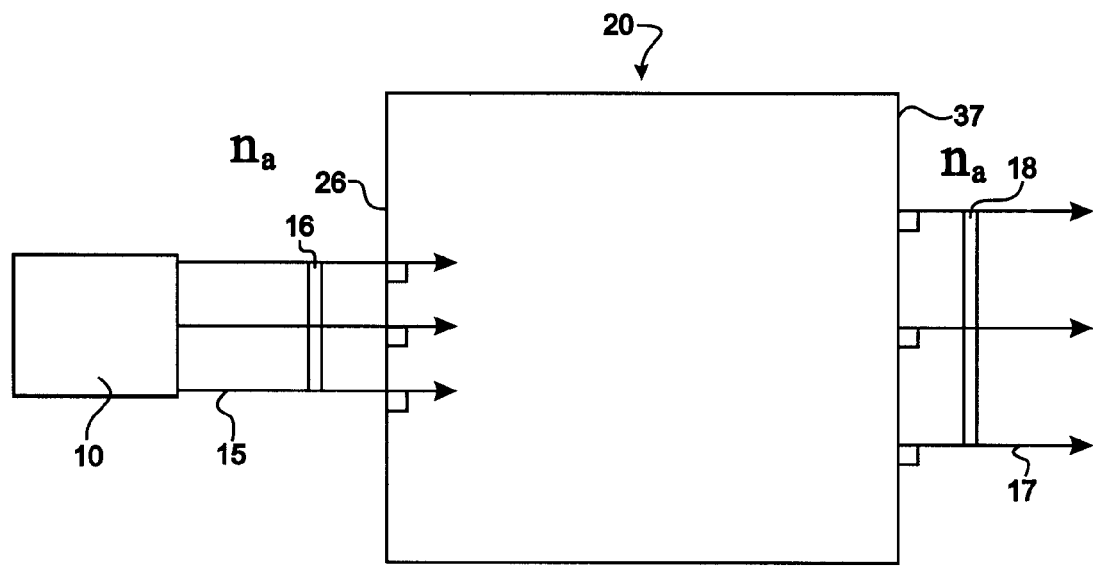

With specific reference to FIG. 2 of the drawings, there is shown another embodiment of an optical system 20 according to the present teachings in which collimated input light 15 is accepted and an expanded beam of collimated output light 17 is produced. The embodiments of both FIG. 1 and FIG. 2 are passive optical systems and exhibit AIRI. Each optical system 20 forms a housing that is sufficiently stiff that its geometry is substantially independent of changes in the ambient environment. In addition, an index of refraction of components through which the light travels within the housing does not change when the ambient index of refraction, $n_a$, changes.

Figure 3:
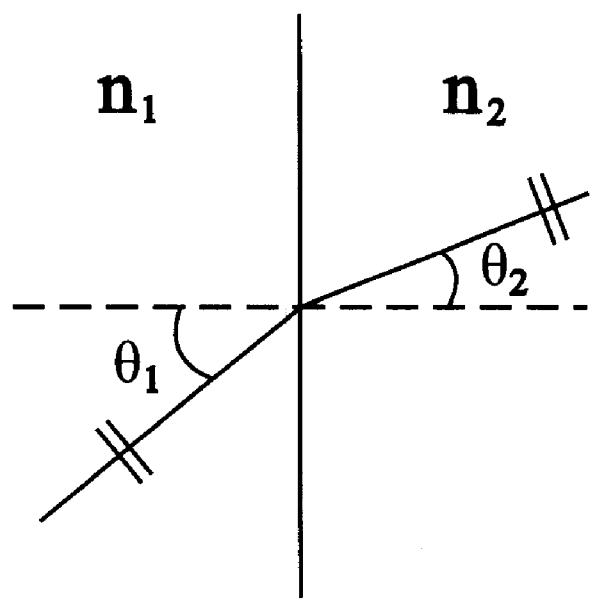
FIGS. 3 and 4 are illustrations of the optical properties used in embodiments of optical systems according to the present teachings.
Figure 4:
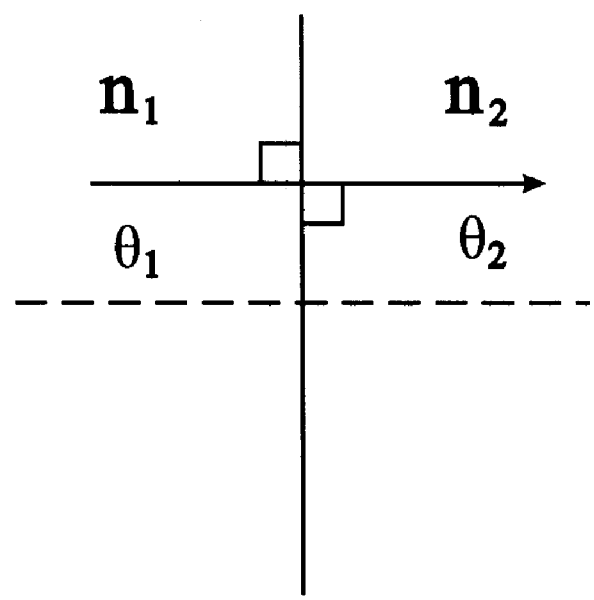

With specific reference to FIGS. 3 and 4 of the drawings, there is shown an illustration of the behavior of light at the junction between first and second materials having dissimilar indices of refraction, $n_1$ and $n_2$. The light path in both FIGS. 3 and 4 follows Snell's Law:

$$n_1 \sin \theta_1 = n_2 \sin \theta_2$$

Where $n_1$ is the index of refraction of the first material, $\theta_1$ is the angle of incidence of the impinging light ray at the junction, $n_2$ is the index of refraction of the second material, and $\theta_2$ is the angle of refraction of the transmitted light ray at the junction. FIG. 3 illustrates the behavior of light at a non-perpendicular or non-zero angle of incidence, $\theta_1$. In FIG. 3, the angle of refraction, $\theta_2$, is a function of the relationship between the indices of refraction of the two materials.

Snell's Law may be rewritten as:

$$\theta_2 = \sin^{-1}\left[\frac{n_1}{n_2}\sin\theta_1\right]$$

With specific reference to FIG. 4 of the drawings, there is shown an illustration of Snell's Law when the angle of incidence is perpendicular or zero degrees relative to the junction between the first and second materials. As one of ordinary skill in the art appreciates, based upon Snell's Law, when the angle of incidence is zero degrees, the angle of refraction, $\theta_2$, is also zero degrees regardless of the values of the indices of refraction of both first and second materials. The zero degrees angle of incidence, therefore, neutralizes any impact the index of refraction has on the angle of refraction. Using this principle for useful purposes, an optical system 20 accepts light at an angle of incidence of zero degrees.

With reference to FIGS. 1 and 2, if the input light 15 is not collimated, a surface of curvature of an input surface 26 is configured to be parallel to a wavefront curvature of the input light 15. When the surface of curvature is parallel to a wavefront curvature, the surface is also parallel to the impinging light wavefront as shown in the drawings. Similarly, a surface of curvature of the output surface 37 is configured to be parallel to a wavefront curvature of the output light 17. Collimated output light 17, therefore, calls for a planar output surface 37 and collimated input light 15 calls for a planar input surface 26. Uncollimated input light 15 calls for an input surface 26 having a non-planar shape. If the desired output wavefront is converging or diverging, the output surface matches the converging or diverging profile such that the output surface is orthogonal to the impinging rays.

Figure 5:
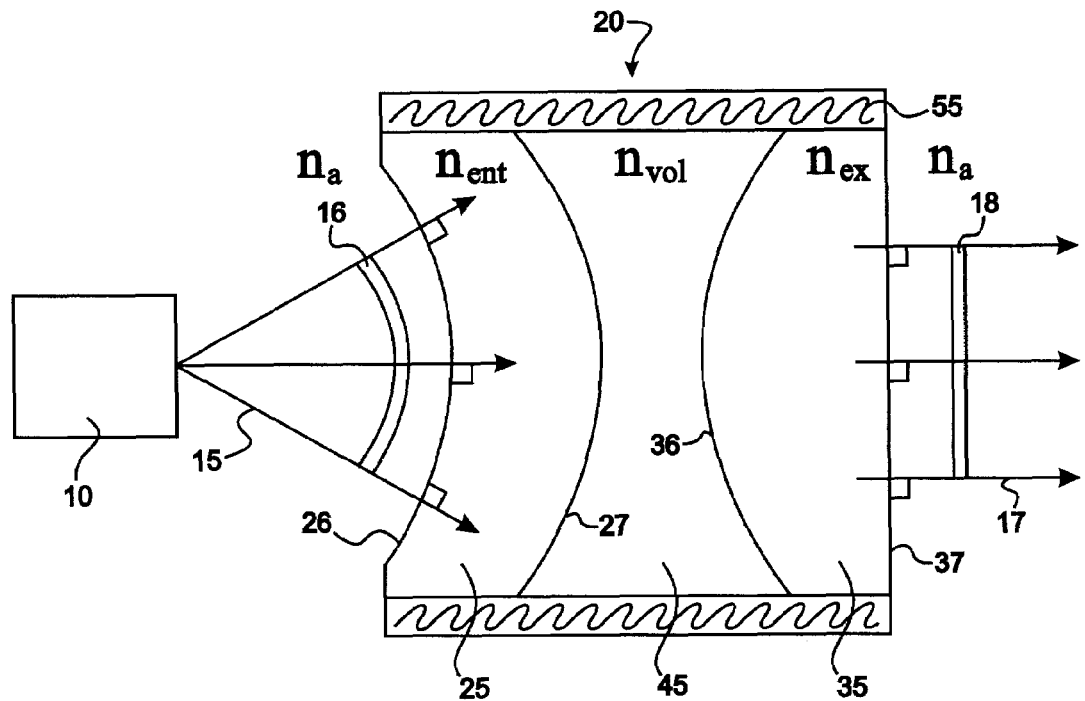
FIG. 5 is a cross sectional view of an embodiment of a collimator according to the present teachings.

With specific reference to FIG. 5 of the drawings, there is shown an optical system 20 according to the present teachings, a specific embodiment of which is a collimator having an entrance optical element 25, an exit optical element 35, and a volume 45 disposed therebetween. The entrance optical element 25 has an input surface 26 and an output surface 27. Similarly, the exit optical element 35 has an input surface 36 and an output surface 37. In a specific embodiment, the entrance and exit optical elements 25, 35 are both glass. Alternative embodiments may use different materials for the entrance and exit optical elements 25, 35 provided that the index of refraction of the material does not change with changes in the ambient index of refraction. The volume 45 may contain a gas, liquid, solid, vacuum, or any combination thereof because it is decoupled from the ambient environment.

The input surface of the volume 45 has the same shape as the output surface 27 of the entrance optical element 25. Similarly, the output surface of the volume 45 has the same shape as the input surface 36 of the exit optical element 35. In a specific embodiment, the output surface 27 of the entrance optical element 25 has a quantifiable radius of curvature. The volume 45 is sealed and sufficiently stiff so that an index of refraction of the volume, $n_{vol}$, is insensitive to changes in the index of refraction of the ambient environment in which the optical system 20 is disposed. Accordingly, the refraction of light at the junction of the entrance optic element 25 and the volume 45 and the junction of the volume 45 and the exit optic element 35 occurs in a specific manner regardless of a change in the index of refraction of the ambient environment. In a specific example, the volume 45 is a simple void. During production of the optical system, air in the volume 45 is evacuated and the volume 45 is then hermetically sealed to maintain a vacuum therein. The hermetic seal ensures that the index of refraction of the volume, $n_{vol}$, remains constant when the ambient index of refraction, $n_a$, changes.

In the collimator 20 of FIG. 5, input light 15 enters from an environment having an ambient index of refraction, $n_a$, and the output light 17 exits to the same environment. The entrance optical element 25 has an index of refraction of $n_{ent}$. The light exits light source 10 and diverges in the ambient environment space between the light source 10 and the input surface 26 of the entrance optical element 25. The optical system 20 is configured and spaced from the light source 10 so that a wavefront curvature 16 of the input light 15 is parallel to a surface of curvature of the input surface 26 of the entrance optical element 25 at the point where the input light 15 meets the input surface 26. Put another way, the input light 15 when represented as rays, is perpendicular to the entrance surface 26. Because the input light 15 rays are perpendicular to the input surface 26 of the entrance optical element 25 and because the wavefront curvature of the input light 15 does not change with the index of refraction of the ambient environment, Snell's Law dictates under these circumstances that there is no refraction of the input light 15 for any value of the index of refraction of the ambient environment, $n_a$, or the index of refraction of the entrance optical element 25, $n_{ent}$. Once the light enters the entrance element 25, it is manipulated through refraction at the output surface 27 of the entrance optical element 25, which is the junction between the entrance optical element 25 and the volume 45. The light is also manipulated through refraction at the input surface 36 of the exit optical element 35, which is the junction between the volume 45 and the exit optical element 35. The angle of incidence is non-zero at the output surface 27 of the entrance optical element 25. According to Snell's Law, therefore, the angle of refraction at the output surface 27 of the entrance optical element 25 is a function of the ratio of the indices of refraction for the entrance optical element 25 and the volume 45. Similarly, the angle of incidence at the input surface 36 of the exit optical element 35 is non-zero. Therefore the angle of refraction at the input surface 36 of the exit optical element 35 is a function of the ratio of the indices of refraction of the volume 45 and the exit optical element 35.

Assuming that the volume acts as a lens, the refraction of light within the volume 45 of the optical system 20 follows the modified thin lens equation:

$$\frac{1}{f} = (n_{vol} - n)\left(\frac{1}{r_{ent}} - \frac{1}{r_{ex}}\right)$$

Wherein f is the focal length of the lens, $n_{vol}$ is the index of refraction of the volume 45, n is the index of refraction of the entrance and exit elements 25, 35, $r_{ent}$ is the radius of curvature of the output surface 27 of the entrance optical element 25 and $r_{ex}$ is the radius of curvature of the input surface 36 of the exit optical element 35. The radius of curvature is chosen to be positive if the center of curvature and the source are on opposite sides of the vertex. In the collimator embodiment of FIG. 5, the light is manipulated within the volume 45 according to the thin lens equation so that the output light 17 exits the output surface 37 of the exit optical element 35 such that a wavefront curvature 18 of the output light 17 is parallel to a surface of curvature of the output surface 37 of the exit optical element 35. In the specific collimator embodiment of FIG. 5, the output surface 37 of the exit optical element 35 is nominally planar to negate any refraction of the output light 17 resulting from a change in the ambient index of refraction, $n_a$.

Because the indices of refraction of the optical elements between the input surface 26 of the entrance optical element 25 and the output surface 37 of the exit optical element 35 remain constant regardless of the environment within which the optical system 20 is placed, the output light 17 is predictably and repeatably collimated and is insensitive to changing values of the ambient environment index of refraction, $n_a$.

Alternative configurations to the specific embodiment of FIG. 5 of a collimator according to the present teachings include different entrance and exit optical elements 25, 35 having varying indices of refraction, thicknesses, and surfaces of curvature. As one of ordinary skill in the art appreciates, however, a collimator will have a planar output surface 37 of the exit optical element 35. In this case, a different thin lens equation is used to accommodate the different entrance element and exit element indices of refraction. Other alternative embodiments may have a volume 45 comprising two or more optical elements creating one or more interfaces therein. In that case, the light is manipulated through multiple junctions between differing indices of refraction, the refraction at each junction following Snell's Law. The single volume 45 as shown in FIG. 5 of the drawings as a void containing a vacuum is one of the simpler and more straightforward of the possible embodiments.

As one of ordinary skill in the art appreciates, because the optical system 20 of FIG. 5 is passive, it can also act as a focusing element or optical coupler when light passes through it in the opposite direction. In the embodiment of a focusing optical system or optical coupler, the input surface 26 of the exit optical element 25 accepts collimated input light 17 and produces focused output light 15 to a focal point as dictated by a radius of curvature of the output surface 26 of the entrance optical element 25.

The entrance optical element 25 and the exit optical element 35 each have an outer circumference. A frame element 55 has an inner circumference that is configured to envelop the outer circumferences of the entrance and exit optical elements. A seal between the frame element 55 and optical elements 25, 35 are adapted to prevent ambient atmospheric conditions from affecting an index of refraction associated with the volume 45. Alternative embodiments include multiple components within the volume 45 that may comprise air, gas, liquid, solid or a combination of any of these in which case, the seal maintains the constant index of refraction for each component in the volume regardless of the index of refraction of the ambient environment.

Figure 6:
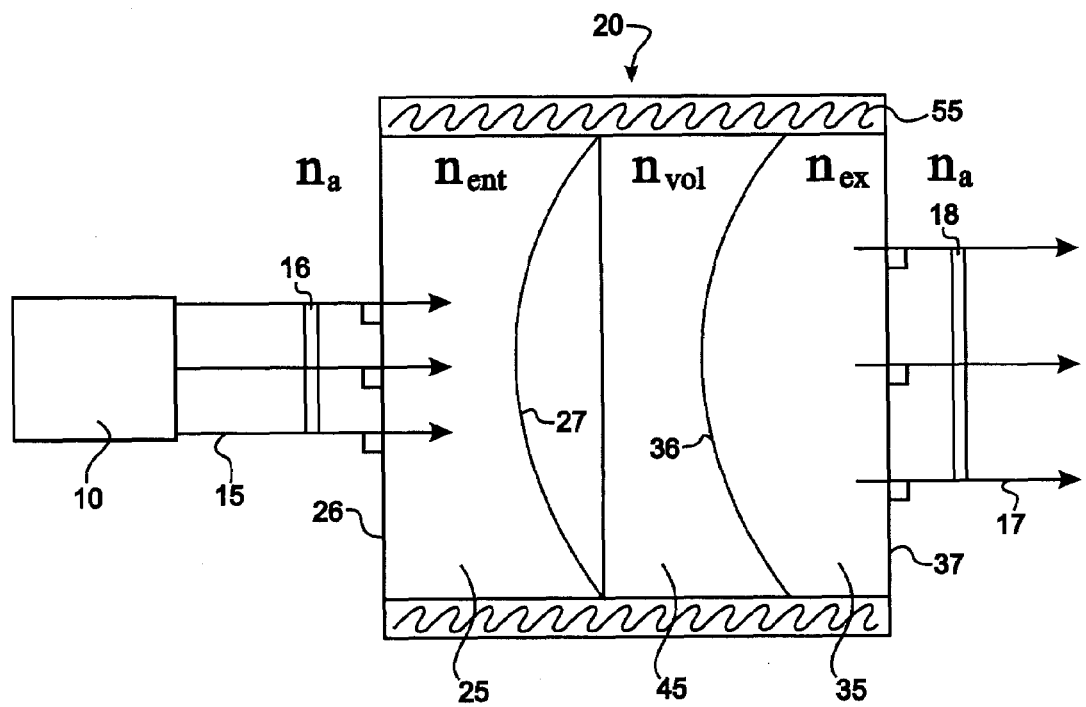
FIG. 6 is a cross sectional view of an embodiment of a beam expander according to the present teachings.

With specific reference to FIG. 6 of the drawings, there is shown an embodiment of a beam expander according to the present teachings in which the input light 15 is collimated and the output light 17 is collimated and expanded relative to the input light 15. In the specific embodiment illustrated, the input light 15 is collimated and meets a nominally planar input surface 26 of the entrance optical element 25 such that the input light 15 wavefront curvature 16 is parallel to the surface of curvature of the input surface 26 of the entrance optical element 25. Light is manipulated through the entrance optical element 25, volume 45 and exit optical element 35 in a similar fashion as described with respect to the collimator embodiment of FIG. 5 and according to the thin lens equation. In the specific embodiment illustrated, the output surface 27 of the entrance optical element 25 is convex and expands the light. The input surface 36 of the exit optical element 35 is spaced apart from the output surface 27 of the entrance optical element 25 according to the amount of beam expansion desired. The indices of refraction of the entrance element 25, the volume 45 and the exit optical element 35 are selected to manipulate the light from the collimated input light 15 to the collimated output light 17 having a desired beam diameter. The surface of curvature of the output surface 37 of the exit optical element 35 is configured to be planar and parallel to the wavefront curvature 18 of the collimated output light 17. Because the wavefront curvature 18 of the output light 17 is parallel to the surface of curvature of the output surface 37, the optical behavior of the output light 17 is independent of the ambient index of refraction, $n_a$. A distance between the output surface 27 of the entrance optical element 25 and the input surface 36 of the exit optical element 35 can control the amount of beam expansion.

Alternative configurations to the specific embodiment of FIG. 6 of a beam expander according to the present teachings include different entrance and exit optical elements 25, 35 having varying indices of refraction, thicknesses, and surfaces of curvature. The input and output optical surfaces 26 and 37 may be concave or convex. Advantageously, the refracting surfaces internal to the optical system 20 may take on any level of complexity and still exhibit AIRI provided that the indices of refraction of the components between the input surface 26 of the entrance optical element 25 and the output surface 37 of the exit optical element 35 remain constant with changes in the ambient environment. As one of ordinary skill in the art appreciates, however, a beam expander that produces collimated output light 17 has a nominally planar output surface 37 of the exit optical element 35. Alternative embodiments may have a volume 45 comprising two or more optical elements creating two or more interfaces therein. The single volume 45 as shown in FIG. 6 of the drawings is one of the simpler and more straightforward of the possible embodiments. As one of ordinary skill in the art appreciates, the embodiment of FIG. 6 can also perform a beam reducing function by accepting light from an opposite direction. Specifically, collimated input light 17 is received by the planar input surface 37 of the exit optical element 35 and collimated output light 15 with a smaller beam diameter is produced through the output surface 26 of the entrance optical element 25.

Embodiments of the teachings are described herein by way of example with reference to the accompanying drawings describing an optical system for collimating, reducing or expanding light that is insensitive to changes in the index of refraction of the ambient environment. The present teachings may be adapted to provide AIRI to off the shelf optical systems by de-coupling the optical system from the index of refraction of the ambient environment. Specifically, the off the shelf optical system is placed between an entrance optical element 25 with an input surface 26 that is parallel to a wavefront curvature of the impinging input light 15 and an exit optical element 35 with an output surface 37 that is parallel to a wavefront curvature of the output light 17. Other variations, adaptations, and embodiments of the present teachings will occur to those of ordinary skill in the art given benefit of the present teachings.

The invention claimed is:

1. An apparatus comprising:
   an entrance optical element having an input surface and an output surface,
   an exit optical element having an input surface and an output surface,
   a volume disposed between the output surface of the entrance optical element and the input surface of the exit optical element, an index of refraction of the volume being insensitive to changes in an ambient index of refraction,
   wherein a surface of curvature of the input surface of the entrance optical element is configured to be parallel to a wavefront curvature of an input light beam and wherein a surface of curvature of the output surface of the exit optical element is configured to be parallel to a wavefront curvature of an exit light beam.

2. An apparatus as recited in claim 1 wherein the entrance optical element, the exit optical element, and the volume are configured and spatially arranged to collimate the input light beam.

3. An apparatus as recited in claim 1 wherein the entrance optical element, the exit optical element, and the volume are configured and spatially arranged to focus the input light beam.

4. An apparatus as recited in claim 1 wherein the entrance optical element, the exit optical element, and the volume are configured and spatially arranged to expand the input light beam.

5. An apparatus as recited in claim 1 wherein the entrance optical element, the exit optical element, and the volume are configured and spatially arranged to reduce the input light beam.

6. An apparatus as recited in claim 1 wherein the entrance optical element has an outer circumference and the exit optical element has an outer circumference, the apparatus further comprising a frame having an inner surface configured to envelop the outer circumferences of the entrance and exit optical elements and a seal adapted to prevent ambient atmospheric conditions from affecting an index of refraction associated with the volume.

7. An apparatus as recited in claim 1 wherein the volume contains a gas.

8. An apparatus as recited in claim 1 wherein the volume contains a liquid.

9. An apparatus as recited in claim 1 wherein the volume contains a near vacuum.

10. An apparatus as recited in claim 1 wherein the volume exhibits a constant index of refraction.

11. An apparatus as recited in claim 1 wherein the volume contains at least one index of refraction transition.

12. A method of designing an optical system comprising
determining a surface of curvature for an input surface of an entrance optical element to be parallel to an input light wavefront curvature,
determining indices of refraction and geometry of the entrance optical element, a volume and an exit optical element according to a desired light path,
determining a surface of curvature for an output surface of an exit optical element to be parallel to an output light wavefront curvature, and
producing the entrance optical element, the volume and the exit optical element according to the determined indices of refraction and geometry wherein the index of refraction of the volume does not change with the atmospheric conditions of the ambient environment.

13. A method as recited in claim 12 wherein the step of producing comprises evacuating and sealing the volume to maintain a vacuum therein.

14. A method as recited in claim 12 wherein the volume holds a substance selected from the group consisting of gas, liquid, solid or combination of a gas and liquid, liquid and solid, gas and solid, and gas, liquid, and solid.

15. A method as recited in claim 12 wherein the volume contains at least one index of refraction transition.

16. A method as recited in claim 12 wherein the entrance optical element is a lens.

17. A method as recited in claim 12 wherein the exit optical element is a lens.

* * * * *